US008507583B2

United States Patent
Nakajima et al.

(10) Patent No.: US 8,507,583 B2
(45) Date of Patent: Aug. 13, 2013

(54) ACTINIC ENERGY RADIATION CURABLE INK-JET INK AND INK-JET RECORDING METHOD

(75) Inventors: Atsushi Nakajima, Tokyo (JP); Masaki Nakamura, Tokyo (JP)

(73) Assignee: Konica Minolta IJ Technologies, Inc., Tokyo (JP)

( * ) Notice: Subject to any disclaimer, the term of this patent is extended or adjusted under 35 U.S.C. 154(b) by 553 days.

(21) Appl. No.: 12/719,879

(22) Filed: Mar. 9, 2010

(65) Prior Publication Data

US 2010/0239777 A1 Sep. 23, 2010

(30) Foreign Application Priority Data

Mar. 18, 2009 (JP) ................. 2009-066206

(51) Int. Cl.
| | | |
|---|---|---|
| A61L 24/00 | (2006.01) | |
| B29D 11/00 | (2006.01) | |
| B41J 2/01 | (2006.01) | |
| B41J 2/16 | (2006.01) | |
| B41J 2/17 | (2006.01) | |
| B41J 2/175 | (2006.01) | |
| C03C 25/10 | (2006.01) | |
| C08F 2/00 | (2006.01) | |
| C08F 20/22 | (2006.01) | |
| C08G 59/14 | (2006.01) | |
| C09D 5/00 | (2006.01) | |
| C09D 11/00 | (2006.01) | |
| C09D 11/10 | (2006.01) | |
| G01D 11/00 | (2006.01) | |

(52) U.S. Cl.
USPC .................. 523/160; 347/1; 347/85; 347/95; 347/100; 347/102; 522/100; 522/102; 522/103; 522/178; 522/181; 522/182; 522/184; 522/186; 522/909; 523/161

(58) Field of Classification Search
USPC ................ 523/160, 161; 522/100, 102, 103, 522/178, 181, 182, 184, 186, 909; 347/1, 347/85, 95, 100, 102
See application file for complete search history.

(56) References Cited

U.S. PATENT DOCUMENTS

| | | | |
|---|---|---|---|
| 5,889,084 A * | 3/1999 | Roth | 523/161 |
| 2003/0199655 A1 | 10/2003 | Yurugi et al. | |
| 2007/0206053 A1* | 9/2007 | Kasai | 347/52 |

FOREIGN PATENT DOCUMENTS

| | | |
|---|---|---|
| EP | 0878482 | 11/1998 |
| EP | 2005097557 | 4/2005 |
| JP | 3014251 | 1/1991 |
| JP | 2881134 | 1/1999 |
| JP | 2005008758 | 1/2005 |
| JP | 2008280460 | 11/2008 |
| WO | 2006098676 | 9/2006 |

OTHER PUBLICATIONS

European Search Report No. EP 10 15 5740.

* cited by examiner

*Primary Examiner* — Patrick Niland
(74) *Attorney, Agent, or Firm* — Lucas & Mercanti, LLP

(57) ABSTRACT

An actinic energy radiation curable ink-jet ink comprising an actinic energy radiation polymerizable compound, wherein the actinic energy radiation polymerizable compound comprises a vinyl ether compound, a total content of the vinyl ether compound is 30% or more by mass, the vinyl ether compound comprises a bis-vinyl ether compound and a multifunctional vinyl compound having three or more vinyl ether groups, 10 to 70% by mass of the ink is the bis-vinyl ether compound, and 5 to 70% by mass of the ink is the multifunctional vinyl compound having three or more vinyl ether groups.

17 Claims, No Drawings

US 8,507,583 B2

ACTINIC ENERGY RADIATION CURABLE INK-JET INK AND INK-JET RECORDING METHOD

CROSS-REFERENCE TO RELATED APPLICATION

This application is based on Japanese Patent Application No. 2009-66206 filed on Mar. 18, 2009 with Japan Patent Office, the entire content of which is hereby incorporated by reference.

FIELD OF TECHNOLOGY

The present invention relates to a new actinic energy radiation curable ink-jet ink and an ink-jet recording method.

TECHNICAL BACKGROUND

Conventionally, as the actinic energy radiation curable ink-jet ink, there are a radically polymerizable and a cationically polymerizable ink-jet inks. Further, of these, known are a non-solvent-type curable ink-jet ink containing substantially no solvent and a solvent dilution-type curable ink-jet ink of low viscosity positively diluted with water or solvent. Fundamentally, the actinic energy radiation curable ink-jet ink features quick drying performance. Therefore, there has widely been brought into practical use a non-solvent-type curable ink-jet ink requiring no solvent-drying load during ink-jet recording or a curable ink-jet ink with a slightly added solvent. Of these, the radically polymerizable ink-jet ink features a wide selection of materials, which, thereby, has great flexibility for ink designing and is widely being researched and developed, resulting in being put into practical use. In contrast, the cationically polymerizable ink-jet ink is unaffected by polymerization inhibition caused by oxygen, and thereby has such advantages that excellent small droplet curability and excellent curability with a low energy radiation source are expressed and a relatively highly flexible cured film can be obtained.

As a cationically polymerizable ink-jet ink composition, those, in which an oxetane compound, an alicyclic epoxy compound, or a vinyl ether compound is used as a polymerizable compound, are widely known (for example, refer to Patent Document 1).

In any of the ink-jet ink compositions disclosed therein, the added amount of an alicyclic epoxy compound is needed to increase to realize adequate curing sensitivity, which, thereby, has produced problems such as an increase in ink viscosity or a decrease in flexibility of a cured film. From the viewpoint of realizing ink viscosity reduction and flexibility of a cured film, a vinyl ether compound is a useful monomer due to its relatively low viscosity, as well as low glass transition point of a cured film. Therefore, actinic energy radiation curable ink-jet inks containing vinyl ethers are proposed and disclosed (for example, refer to Patent Documents 2-4).

In Patent Document 2, an ink-jet ink containing a vinyl ether compound having an average molecular weight 300 to 5,000 is disclosed in which a layer is highly curable and durable.

In Patent Document 3, an image forming method which performs curing with an LED light source is disclosed in which an ink-jet ink containing triethyleneglycol divinyl ether, a pigment, a dispersant, a diallyl phthalate prepolymer, a cationic polymerization initiator, and a sensitizer are used.

In Patent Document 4, a photo-curable resin composition comprising a propenyl ether compound as a kind of vinyl ether is disclosed and applications for a printing ink or a coating agent which has a good curability are proposed.

However obtained sensitivity of curability still did not reach to a sufficient level which the present inventor expected. Therefore the present inventor studied ink-jet ink compositions based on vinyl ether by arranging composition suitable to an activated energy radiation curable and low viscosity for ink-jet use using examples from Patent Documents. As the results, it is found that ink-jet inks based on vinyl ether has specific issues for an ink-jet recording method. For example, in some special recording condition cases in which an image is formed by a serial recording method using divided image and multi-scanning, new problems such as lowering curability specifically, lowering physical properties of layers and odor are occurred. As a result of such diligent investigations, it is found that these problems relate to curing property of inks ejected on an ink which is radiated by an activated energy radiation. This phenomenon markedly occurs when ink of small droplets or thin layer by ink-jet recording is cured with under high humid circumstances.

Other than vinyl ether, cationically polymerizable monomer such as oxcetan compound or epoxy compound or radical polymerizable monomer based on acrylate may be used in combination. However because vinyl ether itself has poor copolymerization with other monomers, it is difficult to obtain stable curing properties. Therefore heretofore an application of vinyl ether to an ink-jet recording method is compelled to restrict a range of use such as suppressing content or limiting curing condition or process.

[Patent Document 1] Japanese Patent Publication No. 3014251
[Patent Document 2] Unexamined Japanese Patent Application Publication (hereinafter referred to as JP-A) No. 2005-8758
[Patent Document 3] JP-A No. 2008-280460
[Patent Document 4] Japanese Patent Publication No. 2881134

SUMMARY

In view of the foregoing, the present invention was achieved. An object of the present invention is to provide an actinic energy radiation curable ink-jet ink and an ink-jet recording method in which viscosity is low and ejection is stable, curing speed and cured layer properties are excellent under broad ink-jet recording conditions.

An object of the present invention described above has been achieved by the following constitutions.

1. An actinic energy radiation curable ink-jet ink comprising an actinic energy radiation polymerizable compound, wherein
    the actinic energy radiation polymerizable compound comprises a vinyl ether compound,
    a total content of the vinyl ether compound is 30% or more by mass,
    the vinyl ether compound comprises a bis-vinyl ether compound and a multi-vinyl ether compound having three or more vinyl ether groups,
    10 to 70% by mass of the ink is the bis-vinyl ether compound, and
    5 to 70% by mass of the ink is the multi-vinyl ether compound.
2. An ink-jet recording method for forming an image comprising repeating steps of:
    applying an actinic energy radiation curable ink-jet ink of claim 1 onto a substrate, radiating an actinic energy radiation onto the actinic energy radiation curable ink-jet ink on the substrate.

The present invention made it possible to provide an image of an actinic energy radiation curable ink-jet ink exhibiting excellent ejection stability of small droplets by high driving frequency, high curing speed under wide range from low to high humidity, and low odor, as well as exhibiting excellent substrate adhesion properties, flexibility, and weather resistance.

THE BEST EMBODIMENT FOR EMBODYING THE INVENTION

The present invention is characterized by the ink of following constitutions.

1. An actinic energy radiation curable ink-jet ink comprising an actinic energy radiation polymerizable compound, wherein the actinic energy radiation polymerizable compound comprises a vinyl ether compound, a total content of the vinyl ether compound is 30% or more by mass, the vinyl ether compound comprises a bis-vinyl ether compound and a multi-vinyl ether compound having three or more vinyl ether groups, 10 to 70% by mass of the ink is the bis-vinyl ether compound, and 5 to 70% by mass of the ink is the multi-vinyl ether compound.

Further following constitution is preferable in above constitution 1.

2. The actinic energy radiation curable ink-jet ink of item 1 further comprising an acryloyl compound or a methacryloyl compound.

3. The actinic energy radiation curable ink-jet ink of item 1 or 2, wherein a total content of the vinyl ether compound is 70-98% by mass of the ink.

4. The actinic energy radiation curable ink-jet ink of any one of item 1 to 3, wherein the multi-vinyl ether compound comprises an oxyalkylene group.

5. The actinic energy radiation curable ink-jet ink of any one of items 1 to 4, wherein the multi-vinyl ether compound comprises four or more vinyl ether groups.

6. The actinic energy radiation curable ink-jet ink of any one of items 1 to 3, wherein at least one vinyl ether group of the multi-vinyl ether compound is represented by Formula 1;

Formula 1:

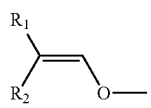

wherein $R_1$ and $R_2$ represents a hydrogen atom and an organic group, and a total number of carbon atoms in the organic group represented by $R_1$ and $R_2$ is 1 or more.

7. An ink-jet recording method for forming an image comprising steps of:

applying the actinic energy radiation curable ink-jet ink of any one of items 1 to 6 onto a substrate, radiating an actinic energy radiation onto the actinic energy radiation curable ink-jet ink on the substrate.

8. An ink-jet recording method of claim 7 further comprising steps of:

applying the actinic energy radiation curable ink-jet ink of any one of item 1 to 6 onto the actinic energy radiation curable ink-jet ink radiated by the actinic energy radiation, and radiating an actinic energy radiation onto the actinic energy radiation curable ink-jet ink.

An embodiment to practice the present invention will now be detailed.

In view of the foregoing, the inventors of the present invention conducted diligent investigations. As a result, the following was discovered, and the present invention was achieved. Combination of bis-vinyl ether compound and multi-vinyl ether compound having three or more vinyl ether groups within a predetermined range results in excellent ink having rapid curing rate of inks ejected on an ink which is radiated by an activated energy radiation and excellent physical properties of cured film related to solvent resistance and weather resistance. Further by adding an acryloyl compound, better properties of cured film are obtained.

When bis-vinyl ether compound or multi-vinyl ether compound having three or more vinyl ether groups is used alone, the properties of the present invention cannot be obtained. Further in case of using out of a predetermined ratio, the properties of the present invention also cannot be obtained. Therefore an effect of the present invention is estimated by following mechanism: in case of polymerization or cross-linking of vinyl ether by photo-cationic polymerization, important is that a certain amount of vinyl ether group remains without polymerizing or cross-linking and the residual vinyl ether group reacts with active species and results in deactivating active species which destroy cross-linked points in cured film and are the cause of decreasing solvent resistance and weather resistance. In case of excess multi-vinyl ether compound having three or more vinyl ether groups, ejection properties deteriorate by undesirable properties such as high ink viscosity or thixotropy by mutual interaction. Properties of cured film become much better by adding (meth)acryloyl compound into vinyl ether compound. It is well-known that vinyl ether can polymerize radically with acryloyl compound as well as cationic polymerization. In a step of generating acid by using photo-acid-generating agent in cationic polymerization, it is realized that there occurs two step reactions: a step of generating radicals is followed by a step of generating acid by hydrogen abstraction.

Improvement on solvent resistance and weather resistance above is realized that by combining (meth)acryloyl compound, cationic polymerization of vinyl ether and radical polymerization of (meth)acryloyl compound with vinyl ether compound are promoted simultaneously and polymer chains can be fully intertwined each other.

The actinic energy radiation curable ink-jet ink of the present invention comprise a bis-vinyl ether compound and a multi-vinyl ether compound having three or more vinyl ether groups as an essential component, and further comprise an actinic energy radiation polymerization initiator which generates a polymerization active species by an actinic energy radiation. Cationically polymerizable compound and radically polymerizable compound conventionally known in the art may be used in combination as polymerizable compounds. Further colorant component and several additives may be added.

The constituent element of the actinic energy radiation curable ink-jet ink and an ink-jet recording method of the present invention will be described in details as below.

<<Bis-Vinyl Ether Compound>>

Bis-vinyl ether compound of the present invention is defined as a compound which comprises two vinyl ether groups as functional groups in one molecule. Specific example of bis-vinyl ether compound include: 1,4-butanediol divinyl ether, 1,6-hexanediol divinyl ether, neopentylglycol divinyl ether, nonanediol divinyl ether, cyclohexandiol divinyl ether, cyclohexane dimethanol divinyl ether, diethyleneglycol divinyl ether, triethyleneglycol divinyl ether (TEGDVE), trimethylolpropane divinyl ether, ethyleneoxide modified trimethylolpropane divinyl ether, and pentaerythritol divinyl ether.

Other specific example include: vinyl ether compound having alicyclic skeleton containing at least oxygen atom disclosed in Japanese Patent Publication No. 4037856, vinyl ether compound having alicyclic skeleton disclosed in JP-A No. 2005-015396, 1-indanyl vinyl ether disclosed in JP-A No. 2008-137974, 4-acetoxycyclohexyl vinyl ether disclosed in JP-A No. 2008-150341.

Further α- or β-position of vinyl ether group in above vinyl ether compound can be replaced and introduced by substituent group such as propenyl ether group, isopropenyl ether group, butenyl ether group and isobutenyl ether group.

Among these bis-vinyl ether compounds, diethyleneglycol divinyl ether, triethyleneglycol divinyl ether, cyclohexandiol divinyl ether, cyclohexane dimethanol divinyl ether is preferable in view of curability, substrate adhesion properties, odor and safety. Content of bis-vinyl ether compounds based on total ink is preferably 10 to 70% by mass, more preferable 40 to 70% by mass. In the case of 10% or less by mass, it is difficult to keep sufficient ejection stability. In the case of 70% or more by mass, curing rate of curing overlapped inks under high humid circumstance becomes slow, increase odor, and decrease physical properties of cured layers such as solvent resistance and weather resistance.

<<Multi-Vinyl Ether Compound Having Three or More Vinyl Ether Groups>>

Multi-vinyl ether compound having three or more vinyl ether groups of the present invention is defined as a compound which comprises three or more vinyl ether groups as functional groups in one molecule, and preferably comprises oxyalkylen group.

At least one vinyl ether group of the multi-vinyl ether compound is preferably represented by Formula 1.

In Formula 1, $R_1$ and $R_2$ represents a hydrogen atom and an organic group, and a total number of carbon atoms in the organic group represented by $R_1$ and $R_2$ is 1 or more.

In Formula 1, an organic group represented by $R_1$ and $R_2$ include: alkyl group having 1 to 6 carbon atoms such as methyl group, ethyl group, propyl group or butyl group; aryl group, furyl or thenyl group, alkenyl group having 1 to 6 carbon atoms such as allyl group, 1-propenyl group, 2-propenyl group, 2-methyl-1-propenyl group, 2-methyl-2-propenyl group, 1-butenyl group, 2-butenyl group or 3-butenyl group; aryl group such as phenyl group, benzyl group, fluorobenzyl group, methoxy benzyl group or phenoxyethyl group; alkoxy group such as methoxy group, ethoxy group, butoxy group; alkyl carbony group having 1 to 6 carbon atoms such as propyl carbonyl group, butylcarbonyl group or pentylcarbonyl group; alkoxy carbonyl group having 1 to 6 carbon atoms such as ethoxycarbonyl group, propoxycarbonyl group or butoxycarbonyl group; and alkoxy carbamoyl group having 1 to 6 carbon atoms such as ethoxycarbamoyl group, propylcarbamoyl group or butylcarbamoyl group; however is not limited thereto. Among them, hydrocarbon group except for hetero atom is preferred as an organic group in view of curability.

Specific example of the multi-vinyl ether compound having three or more vinyl ether groups preferable to the present invention include: trimethylolpropane trivinyl ether, ethyleneoxide modified trimethylolpropane trivinyl ether, pentaerythritol trivinyl ether, pentaerythritol tetravinyl ether, ethyleneoxide modified pentaerythritol trivinyl ether, ethyleneoxide modified pentaerythritol tetravinyl ether, pentaerythritol hexavinyl ether, and ethyleneoxide modified pentaerythritol hexavinyl ether.

As the multi-vinyl ether compound having three or more vinyl ether groups, compound having an oxyalkylene group in a molecule represented by Formula 2 is preferable, in view of compatibility with other compound or solubility, and substrate adhesion properties. Total numbers of oxyalkylene groups are preferably 10 or less. When the total number of oxyalkylene groups are 10 or more, water resistance of cured film decreases. Even though Formula 2 exemplifies an oxyethylene group as an oxyalkylene group, an oxyethylene group having other number of carbon atoms can be available. Number of carbon atoms of an oxyethylene group is preferably 1 to 4, more preferably 1 to 2.

Formula 2:

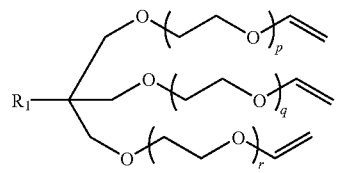

In Formula 2, $R_1$ represents a hydrogen atom or an organic group defined as same as Formula 1. Same organic group represented by $R_1$ and $R_2$ in Formula 1 can be used as an organic group represented by $R_1$. Among them, a hydrocarbon group except for a hetero atom is preferred as an organic group in view of curability.

Further, p, q, r represent 0 or an integer of 1 or more, and p+q+r represent an integer of 3 to 10.

A multi-vinyl ether compound having four or more vinyl ether groups include a compound represented by Formula 3 and Formula 4.

Formula 3:

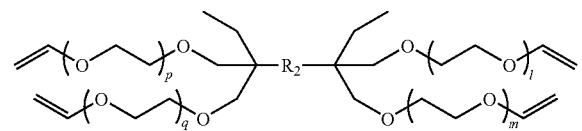

In Formula 3, $R_2$ represent a linking group comprising a methylene group, or any one of alkylene group, oxyalkylene group and ester group each having 1 to 6 carbon atoms. p, q, l and m represent 0 or an integer of 1 or more, and p+q+l+m represent an integer of 3 to 10.

Formula 4:

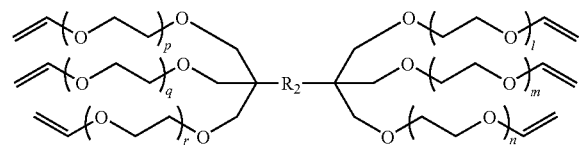

In Formula 4, $R_2$ represent a linking group comprising a methylene group or any one of alkylene group, oxyalkylene group and ester group each having 1 to 6 carbon atoms. p, q, l m and n represent 0 or an integer of 1 or more, and p+q+r+l+m+n represent an integer of 3 to 10.

Even though Formula 3 and Formula 4 exemplify an oxyethylene group as an oxyalkylene group, an oxyethylene group having other number of carbon atoms can be available. Number of carbon atoms of an oxyethylene group is preferably 1 to 4, more preferably 1 to 2.

According to the present invention, content of the multi-vinyl ether compound having three or more vinyl ether groups is preferably 5 to 70% by mass based on ink, and more preferably 15 to 70% by mass. The content is 5% or less result in decrease of curing rate of overlapped ink, generation of odor, and deteriorations of physical properties in a cured layer such as solvent resistance or weather resistance under the high humidity circumstance. The content is 70% or more result in difficult to keep enough ejection stability in ink-jet recording with small droplet and high driving frequency.

An effect of the present invention can be available by any ratio of the bis-vinyl ether compound and the multi-vinyl ether compound having three or more vinyl ether groups, provided that the content of the bis-vinyl ether compound and the multi-vinyl ether compound having three or more vinyl ether groups each are in the above range based on the ink.

According to the present invention, compound having four or more vinyl ether groups is preferable as the multi-vinyl ether compound having three or more vinyl ether groups in view of obtaining excellent curability such as improving humidity dependence and solvent resistance and weather resistance of cured film. Moreover compound having six or less vinyl ether groups is preferable as the multi-vinyl ether compound having three or more vinyl ether soups.

Further vinyl ether group represented by Formula 1 is preferably used as the above the multi-vinyl ether compound having three or more vinyl ether groups in view of improving curing sensitivity, humidity dependence and decreasing odor.

Formula 1:

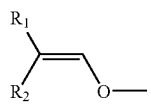

wherein $R_1$ and $R_2$ represents a hydrogen atom and an organic group, and a total number of carbon atoms in the organic group represented by $R_1$ and $R_2$ is 1 or more. An organic group is defined as same as in Formula 1.

(Other Cationically Polymerizable Compounds)

In the ink-jet ink of the present invention, another cationically polymerizable compound, for example, well-known mono-vinyl ether compound, an epoxy compound or an oxetane compound can be used to the extent that the targeted effects of the present invention are not impaired.

Mono-vinyl ether compounds used are as follows:

n-Propyl vinyl ether, isopropyl vinyl ether, n-butyl vinyl ether, isobutyl vinyl ether, 2-ethylhexyl vinyl ether, octadecyl vinyl ether, cyclohexyl vinyl ether, allyl vinyl ether, hydroxyethyl vinyl ether, hydroxybutyl vinyl ether, 9-hydroxynonyl vinyl ether, 4-hydroxycyclohexyl vinyl ether, cyclohexane dimethanol monovinyl ether, and triethylene glycol monovinyl ether.

Other than the above, various types of vinyl ether compounds having been disclosed so far are applicable. Listed are, for example, the compounds containing a (meth)acryloyl group and a vinyl ether group in the molecule disclosed in Japanese Patent Publication No. 3461501; the vinyl ether compounds having an alicyclic skeleton containing at least an oxygen atom disclosed in Japanese Patent Publication No. 4037856; the vinyl ethers having an alicyclic skeleton disclosed in JP-A No. 2005-015396; 1-indanyl vinyl ether disclosed in JP-A No. 2008-137974; and 4-acetoxycyclohexyl vinyl ether disclosed in JP-A No. 2008-150341.

<<Epoxy Compounds>>

As epoxy compounds, any monomers, oligomers, and polymers commonly used for epoxy resins are usable. Specifically, well-known aromatic epoxides, alicyclic epoxides, and aliphatic epoxides are listed. Herein, the epoxides refer to monomers or oligomers thereof. These compounds may be used individually or in combinations of at least 2 types.

As the aromatic epoxides, listed are di- or polyglycidyl ethers produced via reaction of a polyphenol having at least one aromatic nucleus or an alkylene oxide adduct thereof with epichlorohydrin. For example, cited are di- or polyglycidyl ethers of bisphenol A or an alkylene oxide adduct thereof, di- or polyglycidyl ethers of hydrogenated bisphenol A or an alkylene oxide adduct thereof, and novolac-type epoxy resins. Herein, as the alkylene oxide, ethylene oxide and propylene oxide can be listed.

As the alicyclic epoxides, listed are cyclohexene oxide- or cyclopentene oxide-containing compounds obtained by epoxidizing compounds having at least one cycloalkane ring such as cyclohexene or cyclopentene using an appropriate oxidant such as hydrogen peroxide or a peracid. Specific examples thereof include, for example, Celloxide 2021, Celloxide 2021A, Celloxide 2021P, Celloxide 2080, Celloxide 2000, Epolead GT301, Epolead GT302, Epolead GT401, Epolead GT403, EHPE-3150, EHPEL 3150CE (produced by Daicel Chemical Industries, Ltd.); and UVR-6105, UVR-6110, UVR-6128, UVR-6100, UVR-6216, and UVR-6000 (produced by Union Carbide Corp.).

The aliphatic epoxides include, for example, di or polyglycidyl ethers of an aliphatic polyol or an alkylene oxide adduct thereof. Typical examples thereof include diglycidyl ethers of alkylene glycols such as ethylene glycol diglycidyl ether, propylene glycol diglycidyl ether, or 1,6-hexane diol diglycidyl ether; polyglycidyl ethers of polyols such as di- or triglycidyl ethers of glycerin or an alkylene oxide adduct thereof and diglycidyl ethers of polyalkylene glycols such as diglycidyl ethers of polyethylene glycol or an alkylene oxide adduct thereof or diglycidyl ethers of polypropylene glycol or an alkylene oxide adduct thereof. Herein, as the alkylene oxides, ethylene oxide and propylene oxide can be listed.

Further, other than these compounds, monoglycidyl ethers of higher aliphatic alcohols and monoglycidyl ethers of phenol or cresol are usable. Of these epoxides, in view of quick curability, aromatic epoxides and alicyclic epoxides can be used. Of these, alicyclic epoxides are preferable.

Any of these epoxy compounds can be blended in a liquid composition comprising an oxetane compound and a vinyl ether compound in the range of 0-20% by mass, preferably 0-10% by mass, which is preferable from the viewpoint of curability, cured film flexibility, and substrate adhesion properties.

<<Oxetane Compounds>>

An oxetane compound is a compound having at least one oxetane (trimethylene oxide) ring in the molecule. Specifically, there can preferably used 3-ethyl-3-hydroxymethyloxetane (OXT101, produced by Toagosei Co., Ltd.), 1,4-bis[(3-ethyl-3-oxetanyl)methoxymethyl]benzene (OXT121, produced by Toagosei Co. Ltd.), 3-ethyl-3-(phenoxymethyl) oxetane (OXT211, produced by Toagosei Co. Ltd.), di(1-ethyl-3-oxetanyl)methyl ether (OXT221, produced by Toagosei Co. Ltd.), 3-ethyl-3-(2-ethylhexyloxymethyl)oxetane (OXT212, produced by Toagosei Co. Ltd.), and di(1-methyl-3-oxetanyl)methyl ether. Specifically preferable are 3-ethyl-3-hydroxymethloxetane, 3-ethyl-3-(phenoxymethyl)oxetane, and di(1-ethyl-3-oxetanyl)methyl ether. These can be used individually or in combinations of at least 2 types. Any of these oxetane compounds can be blended in a liquid composition comprising an epoxy compound and a vinyl ether compound in the range of 0-20% by mass, preferably 0-10% by mass, which is preferable from the viewpoint of curability, cured film flexibility, and substrate adhesion properties.

In addition, as such a cationically polymerizable compound, a well-known cationically polymerizable cyclic compound may be contained, in addition to a vinyl ether compound, an epoxy compound, or an oxetane compound. Herein, in the present invention, a vinyl ether compound, an epoxy compound, and an oxetane compound and also other cyclic compounds are referred to as cationically polymerizable compounds.

According to the present invention, a total content of the vinyl ether compound is 30% or more by mass. An upper limit is preferably 98° A) by mass, more preferably 70-98% by mass. In case of 30% or less, problems may be occurred such that long time is required for curing or to obtain sufficient film strength immediately after curing is difficult, because copolymerization rate of vinyl ether compound with other polymerizable monomer becomes small. In case of 98% or more, it becomes difficult to combine other composition which is necessary to keep performance as actinic energy radiation curable ink-jet ink.

<<(Meth)Acryloyl Compound>>

(Meth)acryloyl compound is preferred to add to the actinic energy radiation curable ink-jet ink of the present invention having vinyl ether compound as main component, in view of improving physical properties such as solvent resistance and weather resistance. Herein "(Meth)acryloyl compound" means "Acryloyl compound or Methacryloyl compound". An amount of (meth)acryloyl compound is 1-45% by mass based on ink, preferably 1-25% by mass. By adding (meth)acryloyl compound in above range, the solvent resistance and the weather resistance of the recording image obtained by curing ink of the present invention can be further improved.

(Meth)acryloyl group compound include: monofunctional monomer such as isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyl hexahydro phthalic acid, butoxyethyl acrylate, ethoxy diethyleneglycol acrylate, methoxy diethyleneglycol acrylate, methoxy polyethyleneglycol acrylate, methoxy propyleneglycol acrylate, phenoxyethyl acrylate, tetrahydrofurfuryl acrylate, isobonyl acrylate, 2-hydroxyethyl acrylate, 2-hydroxypropyl acrylate, 2-hydroxyl-3-phenoxypropyl acrylate, 2-acryloyloxyethyl succinic acid, 2-acryloyloxyethyl phthalic acd, 2-acryloyloxyethyl-2-hydroxyethyl-phthalic acid, lactone modified flexible acrylate, t-butylcyclohexyl acrylate, N-vinyl pyrroridone, N-vinyl caprolactam; bifunctional monomer such as triethylneglycol diacrylate, tetraethylneglycol diacrylate, polyethylneglycol diacrylate, tripropylneglycol diacrylate, polypropylneglycol diacrylate, 1,4-butanediol diacrylate, 1,6-hexanediol diacrylate, 1,9-nonanediol diacrylate, neopentylglycol diacrylate, dimethylol-tricyclodecane diacrylate, diacrylate of ethyleneoxide adduct with bisphenol-A, diacrylate of propyleneoxide adduct with bisphenol-A, hydroxyl pivalic acid neopentylglycol diacrylate, polytetramethyleneglycol diacrylate; and multi-functional monomer more than trifunctional such as trimethylolpropane triacrylate, ethyleneoxide (EO) modified trimethylolpropane triacrylate, pentaerythritol triacrylate, pentaerythritol tetraacrylate, dipentaerythritol hexaacrylate, ditrimethylolpropane tetraacrylate, glycerinpropoxy triacrylate, caprolactone modified trimethylolpropane triacrylate, pentaerythritol ethoxy tetraacrylate, caprolactam modified dipentaerythritol hexaacrylate.

Further polymerizable olygomers can be usable as same as monomers. Example of polymerizable olygomer includes epoxy acrylate, aliphatic urethane acrylate, aromatic urethane acrylate, polyester acrylate, and linear acryl olygomer.

In view of sensitization, irritating to skin and eye, mutagenicity and toxicity, among above monomers, preferred is isoamyl acrylate, stearyl acrylate, lauryl acrylate, octyl acrylate, decyl acrylate, isomyristyl acrylate, isostearyl acrylate, ethoxy diethyleneglycol acrylate, methoxy diethyleneglycol acrylate, methoxy polyethyleneglycol acrylate, methoxy propyleneglycol acrylate, isobonyl acrylate, lactone modified flexible acrylate, 1,6-hexanediol diacrylate, 1,9-nonanediol diacrylate, ethyleneoxide modified trimethylolpropane triacrylate, dipentaerythritol hexaacrylate, ditrimethylolpropane tetraacrylate, glycerinpropoxy triacrylate, caprolactone modified trimethylolpropane triacrylate, pentaerythritol ethoxy tetraacrylate, caprolactam modified dipentaerythritol hexaacrylate, aliphatic urethane acrylate, aromatic urethane acrylate, polyester acrylate, and linear acryl olygomer.

<<Actinic Energy Radiation Polymerization Initiator>>

Known photo-acid-generating agent can be usable as an actinic energy radiation polymerization initiator of the present invention. Specifically listed are acid generating agents such as aryl sulfonium salt derivatives (Silacure UVI-6990 and Silacure UVI-6974 produced by Union Carbide Corp.; Adekaoptomer SP-150, Adekaoptomer SP-152, Adekaoptomer SP-170, and Adekaoptomer SP-172 produced by Asahi Denka Kogyo K.K.; CPI-100P, CPI-110P, and CPI-110A produced by San Apro Ltd.; TS-91 produced by Sanwa Chemical Co., Ltd.; and Esacure1187 and Esacure1188 produced by Lamberti Co.); allyl iodonium salt derivatives (RP-2074 produced by Rodia Co. and Irgacure 250 produced by Ciba Geigy Co.); Arene-ion complex derivatives (Irgacure 250 produced by Ciba Geigy Co.); diazonium salt derivatives; triazine-based initiators; or other halides.

Such a photo-cationic polymerization initiator is preferably contained at 0.2-10 parts by mass based on 100 parts by mass of a cationically polymerizable compound, more preferably 0.5-5 parts by mass. When the content of the photo polymerization initiator is less than 0.2 parts by mass, a cured material is difficult to obtain. Even when the content is more than 10 parts by mass, the initiator itself serves as a UV absorbent, resulting in a shielding effect in the ink, whereby no effect to further enhance curability is produced and also ink storage stability at low and high temperatures is degraded. These photo-cationic polymerization initiators can be used individually or in combinations of at least 2 types.

As the sensitizer for an actinic energy radiation polymerization initiator, when a sulfonium salt is used as a photoinitiator, anthracene and anthracene derivatives (e.g., Adekaoptomer SP-100 produced by Asahi Denka Kogyo K.K., diethoxyanthracene, and dibutoxyanthracene) are listed. In the case of an iodonium salt photo-initiator, thioxanthenes are usable. These sensitizers can be used individually or in combinations of at least 2 types. The added amount thereof is preferably 0.2-10 parts by mass based on 100 parts by mass of a cationically polymerizable compound, more preferably 0.5-8 parts by mass. In the case of less than 0.2 parts by mass, poor sensitizing effects are produced. In contrast, in the case of more than 10 parts by mass, the problems of coloration of a sensitizer itself and of coloration due to decomposition of the sensitizer.

Known radically polymerizable compound can be usable, in the case of combination of radically polymerizable compound as a polymerization initiator.

<<Colorants>>

When the ink-jet ink of the present invention is colored, a pigment is preferably used as a colorant. As the pigment, carbon black, colorless inorganic pigments such as titanium oxide or calcium carbonate, or colored organic pigments are usable. The organic pigments include insoluble azo pigments such as Toluidino Red, Toluidino Maroon, Hanza Yellow, Benzidine Yellow, or Pyrazolone Red; soluble azo pigments such as Lithol Red, Hello Bordeaux, Pigment Scarlet, or Permanent Red 2B; derivatives from vat dyes such as alizarin, indanthrone, or Thioindigo Maroon; phthalocyanine-based organic pigments such as Phthalocyanine Blue or Phthalocyanine Green; quinacridone-based organic pigments such as Quinacridone Red or Quinacridone Magenta; perylene-based organic pigments such as Perylene Red or Perylene Scarlet; isoindolinone-based organic pigments such as Isoindolinone Yellow or Isoindolinone Orange; pyranthrone-based organic pigments such as Pyranthrone Red or Pyranthrone Orange; thioindigo-based organic pigments; condensed azo-based organic pigments; benzimidazolone-based organic pigments; quinophtharone-based organic pigments such as Quinophthalone Yellow; isoindoline-based organic pigments such as Isoindoline Yellow; and as other pigments, Flavanthrone Yellow, Acylamide Yellow, Nickel Azo Yellow, Copper Azomethine Yellow, Perynone Orange, Anthrone Orange, Dianthraquinonyl Red, and Dioxazine Violet.

Such organic pigments are exemplified with Color Index (C.I.) numbers as follows:

C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, and 185;

C.I. Pigment Orange 16, 36, 43, 51, 55, 59, and 61;

C.I. Pigment Red 9, 48, 49, 52, 53, 57, 97, 122, 123, 149, 168, 177, 180, 192, 202, 206, 215, 216, 217, 220, 223, 224, 226, 227, 228, 238, and 240;

C.I. Pigment Violet 19, 23, 29, 30, 37, 40, and 50;

C.I. Pigment Blue 15, 15:1, 15:3, 15:4, 15:6, 22, 60, and 64;

C.I. Pigment Green 7 and 36; and

C.I. Pigment Brown 23, 25, and 26.

Of the above pigments, due to excellent light resistance, preferable are quinacridone-based organic pigments, phthalocyanine-based organic pigments, benzimidazolone-based organic pigments, isoindolinone-based organic pigments, condensed azo-based organic pigments, quinophtharone-based organic pigments, and isoindoline-based organic pigments.

An organic pigment is preferably in the form of fine particles, having an average particle diameter of 10-150 nm in an ink as a determined value via laser scattering. When the average particle diameter of the pigment is less than 10 nm, light resistance decreases due to the decreased particle diameter. In the case of more than 150 nm, it becomes difficult to maintain dispersion stability and then the pigment tends to precipitate and also ejection stability decreases, resulting in the problem of occurrence of fine mists referred to as satellites. However, in the case of titanium oxide, to provide whiteness and hiding power, average particle diameter is allowed to be 150-300 nm, preferably 180-250 nm.

Further, coarse particles are preferably eliminated via adequate dispersion or filtration so as for the maximum particle diameter of a pigment in an ink not to exceed 1.0 μm. The presence of such coarse particles also degrades ejection stability.

To allow an organic pigment to be fine, the following method is performed: namely, a mixture containing at least 3 components of an organic pigment, a water-soluble inorganic salt of at least 3 factors by mass of the amount of the organic pigment, and a water-soluble solvent is formed into clay, which then is strongly kneaded to form fine sizes, followed by being placed into water to give a slurry form by stirring using a high speed mixer; and then the shiny is repeatedly filtered and washed to eliminate the water-soluble inorganic salt and the water-soluble solvent via aqueous treatment. In such a process to prepare fine-sized particles, any appropriate resin and pigment dispersant may be added.

As the water-soluble inorganic salt, sodium chloride and potassium chloride are listed. Any of these inorganic salts are used in the range of 3-20 factors by mass of the amount of an organic pigment. After dispersion treatment, to realize the halogen ion content specified in the present invention, chlorine ions (halogen ions) are eliminated via washing treatment. When the amount of the inorganic salt is less than 3 factors by mass, a treated pigment is unable to be obtained at a desired size. In contrast, in the case of more than 20 factors by mass, enormous washing treatment in the post-process is required, resulting in a substantially small treatment amount of the organic pigment.

A water-soluble solvent makes it possible to produce an appropriate clay state of an organic pigment and a water-soluble inorganic salt used as a pulverizing aid which is employed to efficiently carry out adequate pulverization. The solvent is not specifically limited if being a water-soluble solvent. However, since temperature elevation during kneading allows the solvent to easily evaporate, a solvent of a boiling point of 120-250° C. is preferable from the viewpoint of safety. Such a water-soluble solvent includes 2-(methoxymethoxy)ethanol, 2-butoxyethanol, 2-(1-pentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low molecular weight polypropylene glycol.

Further, to accelerate adsorption of a pigment dispersant to the surface, a pigment is preferably surface-treated via a well-known technology using acidic treatment, basic treatment, a synergist, or various types of coupling agents, from the viewpoint of ensuring dispersion stability.

To realize adequate density and light resistance, the pigment is preferably contained at 1.5-8% by mass in the case of a color except white in an ink-jet ink and at 1-30% by mass in a white ink employing titanium oxide.

<<Pigment Dispersants>>

As pigment dispersants, listed are a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a copolymer, a modified polyurethane, a modified polyacrylate, a polyether ester-type anionic surfactant, a naphthalenesulfonic acid formalin condensate salt, an aromatic sulfonic acid formalin condensate salt, a polyoxyethylene alkyl phosphoric acid ester, a polyoxyethylene nonylphenyl ether, stearyl amine acetate, and a pigment derivative.

Specific examples of the dispersants include "Anti-Terra-U (a polyaminoamide phosphoric acid salt)," "Anti-Terra-203/204 (a high molecular weight polycarboxylic acid salt)," "Disperbyk-101 (a polyaminoamide phosphoric acid salt and an acid ester), 107 (a hydroxyl group-containing carboxylic acid ester), 110 (an acid group-containing copolymer), 130 (a polyamide), 161, 162, 163, 164, 165, 166, and 170 (a copolymer)," "400," "Bykumen (a high molecular weight unsaturated acid ester)," "BYK-P104, P105 (a high molecular weight unsaturated acid polycarboxylic acid)," "P1048, 240S (a high molecular weight unsaturated acid polycarboxylic acid and a silicon-base)," and "Lactimon (a long-chain amine, an unsaturated acid polycarboxylic acid, and silicon)" (produced by BYK Chemie GmbH).

Further, listed are "Efka 44, 46, 47, 48, 49, 54, 63, 64, 65, 66, 71, 701, 764, and 766" and "Efka Polymer 100 (a modified polyacrylate), 150 (an aliphatic modified polymer), 400, 401, 402, 403, 450, 451, 452, 453 (a modified polyacrylate), and 745 (a copper phthalocyanine-base)" (produced by Efka Chemicals Co.); "Flowlen TG-710 (a urethane oligomer)," "Flownon SH-290 and SP-1000," and "Polyflow No. 50E and No. 300 (an acrylic copolymer)" (produced by Kyoeisha Chemicals Co., Ltd.); and "Disparlon KS-860, 873 SN, and 874 (a polymer dispersant), #2150 (an aliphatic polycarboxylic acid), and #7004 (a polyether ester-type)" (produced by Kusumoto Chemicals, Ltd.).

Still further, listed are "Demol RN, N (a naphthalene-sulfonic acid formalin condensate sodium salt), MS, C, SN-B (an aromatic sulfonic acid formalin condensate sodium salt), and EP," "Homogenol L-18 (a polycarboxylic acid-type polymer)," "Emulgen 920, 930, 931, 935, 950, and 985 (a polyoxyethylene nonyl phenyl ether)," and "Acetamin 24 (a coconut amine acetate) and 86 (a stearylamine acetate)" (produced by Kao Corp.); "Solsperse5000 (a phthalocyanine ammonium salt-base), 13240, 13940 (a polyester amine-base), 17000 (a fatty acid amine-base), 24000, 32000, and 7000" (produced by Zeneca Co.); "Nikkol T106 (a polyoxyethylene sorbitan monooleate)," "MYS-IFX (a polyoxyethylene monostearate)," and "Hexagline 4-0 (a hexaglyceryl tetraoleate)" (produced by Nikko Chemicals Co., Ltd.); and "AJISPER 821, 822, and 824" (produced by Ajinomoto Fine-Techno Co., Inc).

These pigment dispersants are preferably contained at 5-70% by mass based on 100% by mass of a pigment, more preferably 10-50% by mass. In the case of more than 5%, good dispersion stability is realized. In the case of less than 70% by mass, good ejection stability can be maintained.

Further, these pigment dispersants preferably exhibit a solubility of at least 5% by mass at 0° C. with respect to the entire cationically polymerizable compound. In cases where the solubility is more than 5% by mass, when an ink is stored at a low temperature, unfavorable polymer gel or an unfavorable soft aggregate of a pigment is difficult to be generated, resulting in good ink storage stability and ejection stability.

<<Polymerization Inhibitors>>

In the ink of the present invention, a cationic polymerization inhibitor is preferably added from the viewpoint of storage stability. Polymerization inhibitors is preferred to be added intentionally, because vinyl ether has high reactivity and dark reaction tend to proceed by residual acid or by acid slightly generated from polymerization initiator during storage. As such a cationic polymerization inhibitor, alkali metal compounds and/or alkaline earth metal compounds or amines can be listed.

As the amines, preferably listed are alkanolamines, N,N-dimethylalkylamines, N,N'-dimethylalkenylamines, N,N'-dimethylalkynylamines including specifically triethanolamine, triisopropanolamine, tributanolamine, N-ethyldiethanolamine, propanolamine, n-butylamine, sec-butylamine, 2-aminoethanol, 2-methylaminoethanol, 3-methylamino-1-propanol, 3-methylamino-1,2-propanediol, 2-ethylaminoethanol, 4-ethylamino-1-butanol, 4-(n-butylamino)-1-butanol, 2-(t-butylamino)ethanol, N,N-dimethylundecanol, N,N-dimethyldodecanolamine, N,N-dimethyltridecanolamine, N,N-dimethyltetradecanol amine, N,N-dimethylpentadecanolamine, N,N-nonadecylamine, N,N-dimethylicosylamine, N,N-dimethyleicosylamine, N,N-dimethylhenicosylamine, N,N-dimethyldocosylamine, N,N-dimethyltricosylamine, N,N-dimethyltetracosylamine, N,N-dimethylpentacosylamine, N,N-dimethylpentanolamine, N,N-dimethylhexylamine, N,N-dimethylheptanolamine, N,N-dimethyloctanolamine, N,N-dimethylnonanolamine, N,N-dimethyldecanolamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, or N,N-dimethyloctadecylamine. Other than these, quaternary ammonium salts can also be used.

Amount of a photo-cationic polymerization inhibitor is preferably 10-5000 ppm. In the case of at least 10 ppm, desired storage stability is realized, and then increased viscosity of the ink and liquid repellency to the ink-jet nozzles can be realized, which is preferable from the viewpoint of ejection stability. Further, in the case of at most 5000 ppm, the acid generating efficiency of a polymerization initiator is not impaired, resulting in maintaining high curing sensitivity.

A radical polymerization inhibitor is preferably added to the ink of the present invention. It was found that storage stability of ink can be extremely improved by combination use of radical polymerization initiator, even when impurity or residual acid remains in ink. The reason why radical polymerization inhibitor exhibit synergistic effect is considered that ink of the present invention mainly comprise vinyl ether compound as canonically polymerizable compound and vinyl ether compound also act as radically polymerizable compound.

As the radical polymerization inhibitor, listed are methoquinone(hydroquinone monomethyl ether), hydroquinone, 4-methoxy-1-naphthol, a hindered amine-based anti-oxidant, a nitrogen-containing heterocyclic mercapto-based compound, a thio ether-based anti-oxidant, a hindered phenol-based anti-oxidant, an ascorbic acid, zinc sulfate, a thiocyanic acid salt, a thiourea derivative, various sugars, a phosphoric acid-based anti-oxidant, a nitrous acid salt, a sulfurous acid salt, a thiosulfuric acid salt, a hydroxylamine derivative, and a polycondensate of a dicyandiamide and a polyalkylenepolyamine.

The added amount of a radical polymerization inhibitor is preferably 10-5000 ppm. In the case of at least 10 ppm, desired storage stability is realized, and then increased viscosity of the ink and liquid repellency to the ink-jet nozzles can be realized, which is preferable from the viewpoint of ejection stability. Further, in the case of at most 5000 ppm, the acid generating efficiency of a polymerization initiator is not impaired, resulting in maintaining high curing sensitivity.

According to the present invention, ink preferably contains 0.2 to 2% by mass of water. By adding water, ink storage stability can be improved without decreasing curing sensitivity. By adding 0.2% or more by mass of water, effect of improvement for ejection stability such as preventing increasing viscosity and keeping liquid repellency to inkjet nozzle besides improving ink storage stability. In case of adding 2% or more, it tends to result in decreasing storage stability such as dispersability of pigment or precipitation of dispersant or other additives.

<<Metal Ion>>

In the ink-jet ink of the present invention, the total content of Na ion, Ca ion and Mg ion is preferably 100 ppm or less of the ink. Determination of the ion content in an ink is carried out as follows: an ink is stirred with pure water and after separating water phase, ions extracted into the water phase is performed quantitative analysis via ion chromatography.

These alkali metal ions do not affect during general ink storage condition. However in the case of irradiation by actinic energy radiation and various decomposed materials or active species from actinic energy radiation polymerization initiator is generated, it tends to form poorly-soluble salt. Therefore after ejecting ink in long time, poorly-soluble precipitate is formed on the surrounding of the inkjet nozzles and it results in lowering ejection accuracy.

A method for reducing alkali metal ion in an ink is achieved by purification operation to each material used to ink. Especially, pigment, actinic energy radiation polymerization initiator such as sulfonium salt, dispersant, cationically polymerization initiator such as vinyl ether, oxetane and epoxy which are generally available from market may contain alkali metal ion as an impurity during its production process. Therefore each material is preferably purified properly before using in ink. By purification of alkali metal, a content of anion is also decreased, and it effect on suppressing a lowering cationically polymerization by impurity.

Further halogen ion such as chlorine is preferred to decrease as low as possible, because halogen ions extremely result in lowering reactivity of vinyl ether compound under high humidity condition. A total content of halogen ion is 50 ppm or less based on total ink, preferable 100 ppm or less. Reducing halogen ions in an ink is achieved by purification operation to each material used to ink as the same manner as above alkali metal ions.

<<Other Additives>>

In the ink jet ink of the present invention, there can appropriately be used, various additives such as surfactants, lubricants, fillers, anti corrosion agent, antifoaming agents, thickeners, gelling agents, and polymers, if desired.

Further, a small amount of a solvent such as an ester-based solvent, an ether-based solvent, an ether ester-based solvent, a ketone-based solvent, an aromatic hydrocarbon solvent, or a nitrogen-containing organic solvent can also be added as appropriate.

<<Ink Physical Propenies>>

The ink of the present invention preferably has, as physical properties, physical properties values similar to those of a common curable ink-jet ink. Namely, the ink is preferably allowed to exhibit a viscosity of 5-50 mPa·s at 25° C., shear rate dependency as little as possible, and a surface tension of 22-35 mN/m at 25° C.; to have, other than pigment particles, no gel substances having an average particle diameter of more than 1.0 μm; to exhibit a conductivity of at most 10 μS/cm; and to induce no electrical corrosion in the interior of the head. In a continuous type, conductivity needs to be adjusted using an electrolyte, and in this case, the conductivity needs to be adjusted at 0.5 mS/cm or more.

In addition, in physical properties of the ink of the present invention, a more preferable embodiment is that when DSC determination of the ink is carried out at a dropping rate of 5° C./minute in the range of 25° C.--25° C., the calorific value per mass is not exhibited at 10 mJ/mg or more as the exothermic peak. Selection of materials based on the constitution of the present invention makes it possible to prevent heat generation of a given amount or more based on the DSC determination. With such a constitution, even when an ink is stored at low temperatures, generation of gel and deposits can be prevented.

<<Ink Preparation Method>>

The ink-jet ink of the present invention can be produced by sufficiently dispersing a pigment together with a vinyl ether compound and a pigment dispersant using a common homogenizer such as a sand mill. It is preferable that a highly concentrated liquid of a pigment be previously prepared, followed by being diluted with an actinic energy radiation curable compound. Dispersion using such a common homogenizer enables to carry out adequate dispersion. Thereby, no excessive amount of dispersion energy is required and excessively long dispersion duration is unnecessary, whereby properties of an ink component tend not to be changed during dispersion and an ink exhibiting excellent stability can be prepared. The thus-prepared ink is preferably filtered with a filter of a pore diameter of at most 3 μm, more preferably at most 1 μm.

<<Ink-Jet Recording Method>>

The ink-jet ink of the present invention exhibits excellent recording properties in a serial recording method by multipass in which inks are overlap-printed and cured. Specifically, the ink jet recording method of the present invention in which the ink-jet ink is ejected onto a recording medium and then the ink is cured via irradiation of actinic energy radiation to be cured or half-cured state, and then flesh ink is overlapped onto above ink. Again, an actinic energy radiation is irradiated onto the ink. The ink-jet ink of the present invention is especially effective in the case of recording method in which thickness of the ink layer is thin by one irradiation of actinic energy radiation. Specifically, the small droplets of 1 to 20 pl are sequentially cured in above recording method. Further in above recording method using small droplets, it is necessary to eject droplets by high driving frequency in order to keep high productivity. The actinic energy radiation curable ink-jet ink of the present invention exhibits excellent ejection stability in the case of ejecting these small droplets by high driving frequency.

Herein, applicable actinic energy radiation for ultraviolet ray include UV LEDs, UV lasers, mercury arc lamps, Xenon arc lamp, low-pressure mercury lamps, fluorescent lamps, carbon arc lamps, tungsten-halogen lamps and sunlight In the case of curing by using electron beam, generally electron beam having energy of 300 eV or less is used. Dose of radiation of 1 to 5 Mrad of electron beam can be also used for curing instantaneously.

<<Recording Media>>

As recording media used for the ink-jet recording method of the present invention, a wide variety of all the synthetic resins having been used for various end use applications are covered, including, for example, polyester, polyvinyl chloride, polyethylene, polyurethane, polypropylene, acrylic resins, polycarbonate, polystyrene, acrylonitrile-butadiene-styrene copolymers, polyethylene terephthalate, and polybutadiene terephthalate. The thicknesses and shapes of these synthetic resin substrates are not specifically limited. In addition, metals, glass, and printing paper are also usable.

EXAMPLES

Embodiments of the present invention will now be specifically described with the reference to examples, however the present invention is not limited thereto. Incidentally, the expression of "part" or "%" referred to in Examples represents "part by mass" or "% by mass" unless otherwise specified.

<<Multi-Vinyl Ether Compound>>

Specific examples of the multi-vinyl ether compound include compounds bellow. These compounds are synthesized according to well-known synthesis method described in J. Chem. Soc., 1965(2), 1560-1561, Am. Chem. Soc. Vol. 124, No. 8, 1590-1591 (2002) or JP-A No. 2005-015396.

VE1

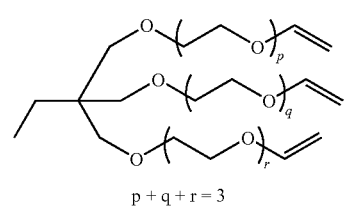

p + q + r = 3

VE2

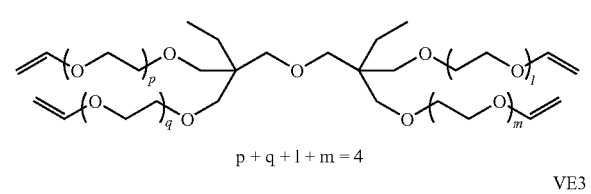

p + q + l + m = 4

VE3

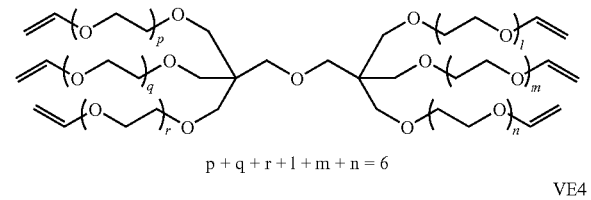

p + q + r + l + m + n = 6

VE4

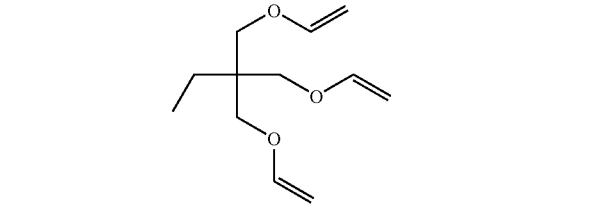

VE5

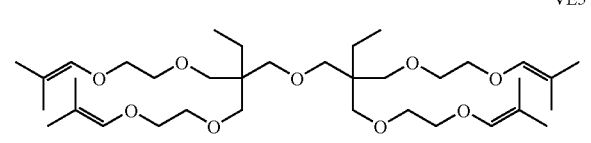

Example 1

Preparation of Inks

Compounds except for an actinic energy radiation polymerization initiator, a sensitizer, a surfactant as described in Table 1, were added to a sand mill and were dispersed for 4 hours to prepare pigment dispersion. Subsequently, other compounds were added and dissolved, followed by filtration using a membrane filter of 0.85 μm to prepare inks 1-17.

Herein, the materials described by product name or abbreviated name in Tables are as follows:

PY150: Pigment Yellow 150 (surface-treated, purified)
PR122: Pigment Red 122 (surface-treated, purified)
PB15:4: Pigment Blue 15:4 (surface-treated, purified)
Carbon black (surface-treated, purified)
Titanium oxide (surface-treated, purified)
PB824 (produced by Ajinomoto Fine-Techno Co., Inc.)
ISODAP (produced by Daiso Co., Ltd.)
TEGDVE: triethylene glycol divinyl ether
OXT221: di[1-ethyl (3-oxetanyl)] methyl ether (produced by Toagosei Co., Ltd.)
C2021P: alicyclic epoxy compound (produced by Daicel Chemical Industries, Ltd.)
TEMPO: 2,2,6,6,-tetramethyl piperidine-N-oxyl
CPI-100P: produced by SAN-APRO Ltd.
Darocure 1173: produced by Ciba
KF351: produced by Shin-Etsu Chemical Co., Ltd.

<<Evaluation of the Inks>>

Each of the prepared inks was evaluated based on the following methods.

(Evaluation of Continuous Ejection Stability)

Using piezo head 512SH (produced by Konica Minolta IJ Technologies, Inc.), 1 L of each ink was continuously ejected at a droplet size of 4 μl and at a frequency of 20 kHz and then comparison with the ejection state immediately after ejection was made. Continuous ejection stability was evaluated based on the following criteria.

A: Ejection accuracies before and after continuous ejection were unchanged at all.

B: Accuracy error of ejection was slightly degraded after continuous ejection but was recovered by cleaning.

C: Accuracy error of ejection was degraded after continuous ejection and was not recovered even by cleaning.

(Evaluation of Curability)

Image recording properties were evaluated on polyethylene terephthalate film by using serial UV cure type printer having piezo head 512SH. A solid image of plain color was formed by providing inks with resolution of 720×720 dpi (herein dpi represent numbers of dots in 2.45 cm) and by using at most 4 droplets of 4 μl per pixel. Numbers of pass was 8, and ejection of ink and irradiation of UV light were repeated for each passes to form an image. Light intensity of UV irradiation per pass was 10 mJ/cm². Ambience during image recording was kept high humid condition as 25° C. and 80% RH. Step charts were printed by each colors and mixed colors, and the film surface immediately after curing was finger-touched to confirm the presence or absence of surface tackiness. Curability was evaluated based on the following criteria.

A: No tackiness is noted.
B: Slight tackiness is noted.
C: Definite tackiness is noted.

(Evaluation of Odor)

Odor was evaluated based on the following criteria.

A: No odor is noted.
B: Slight odor is noted.
C: Definite odor is noted.

As physical properties of a cured film, solvent resistance and weather resistance were evaluated.

(Evaluation of Solvent Resistance)

Solvent resistance of the solid image of each color was evaluated based on the following criteria.

A: No coloration resulting from a colorant removed from the image surface is present on the rubbing cotton swab containing acetone by rubbing 20 or more times.

B: The rubbing cotton swab containing acetone is slightly colored by rubbing 20 or more times.

C: The image surface is peeled off by rubbing 20 or more times with the rubbing cotton swab containing acetone.

(Evaluation of Weather Resistance)

A solid image on vinyl chloride film instead of polyethylene terephthalate film was prepared in the same manner. Then, using accelerating weather resistance tester QUV (produced by Q-Lab Corp.), a cycle of UV irradiation and humidification/condensation was carried out for 1 month, followed by visual observation of the resulting cured film state.

Weather resistance was evaluated based on the following criteria.

A: A cured film is unchanged.
B: A cured film is slightly changed with respect to gloss.
C: A cured film is washed away, resulting in lowered density.

Used ink compositions and results are shown in Table 1.

TABLE 1

|  |  | Inv. Ink 1 | Inv. Ink 2 | Inv. Ink 3 | Inv. Ink 4 | Inv. Ink 5 | Comp. Ink 6 | Inv. Ink 7 | Inv. Ink 8 | Inv. Ink 9 |
|---|---|---|---|---|---|---|---|---|---|---|
| Pigment | PY150 | 3.7 | | | | | | | | |
|  | PR122 | | 4.2 | | | | | | | |
|  | PB15:4 | | | 2.5 | | | 2.5 | 2.5 | 2.5 | 2.5 |
|  | Carbon black | | | | 2.5 | | | | | |
|  | Titanium oxide | | | | | 15 | | | | |
| Dispersant | PB824 | 1.5 | 1.5 | 1 | 1 | 1 | 1 | 1 | 1 | 1 |
| Bis-vinyl ether compound | TEGDVE | 49.2 | 48.7 | 50.9 | 50.9 | 40.4 | 71.9 | 64.9 | 66.9 | 60.9 |
| Multi-vinyl ether compound having three or more vinyl ether groups | VE1 | | | | | | | | | |
|  | VE2 | | | | | | | | | |
|  | VE3 | 40 | 40 | 40 | 40 | 38 | 4 | 6 | 20 | 10 |
|  | VE4 | | | | | | | | | |
|  | VE5 | | | | | | | | | |
| Compound having acryloyl group | EHA | | | | | | | | 4 | 20 |
|  | 1,6-hexanediol diacrylate | | | | | | | | | |
|  | OXT221 | | | | | | | | | |
|  | C2021P | | | | | | | | | |
|  | ISODAP | | | | | | 15 | 20 | | |
|  | CPI-100P | 4 | 4 | 4 | 4 | 4 | 4 | 4 | 4 | 4 |
|  | Darocure1173 | | | | | | | | | |
|  | Diethoxy anthracene | 1.5 | 1.5 | 1.5 | 1.5 | 1.5 | 1.5 | 1.5 | 1.5 | 1.5 |
|  | 2-Ethylamino ethanol | 0.03 | 0.03 | 0.03 | 0.03 | 0.03 | 0.03 | 0.03 | 0.03 | 0.03 |
|  | TEMPO | 0.03 | 0.03 | 0.03 | 0.03 | 0.03 | 0.03 | 0.03 | 0.03 | 0.03 |
|  | KF351 | 0.04 | 0.04 | 0.04 | 0.04 | 0.04 | 0.04 | 0.04 | 0.04 | 0.04 |
| Evaluation Results | Continuous ejection stability | A | A | A | A | A | A | A | A | A |
|  | Curability (surface tackiness) | A | A | A | A | A | C | B | B | A |
|  | Odor | A | A | A | A | A | C | B | B | A |
|  | Solvent resistance | A | A | A | A | A | C | B | A | A |
|  | Weather resistance | A | A | A | A | A | B | B | A | A |

|  |  | Inv. Ink 10 | Inv. Ink 11 | Inv. Ink 12 | Comp. Ink 13 | Comp. Ink 14 | Comp. Ink 15 | Comp. Ink 16 | Comp. Ink 17 |
|---|---|---|---|---|---|---|---|---|---|
| Pigment | PY150 | | | | | | | | |
|  | PR122 | | | | | | | | |
|  | PB15:4 | 2.5 | 2.5 | 2.5 | 2.5 | 2.5 | 2.5 | 2.5 | 2.5 |
|  | Carbon black | | | | | | | | |
|  | Titanium oxide | | | | | | | | |
| Dispersant | PB824 | 1 | 1 | 1 | 1 | 1 | 1 | 1 | 1 |
| Bis-vinyl ether compound | TEGDVE | 65.9 | 55.9 | 20.9 | 10.9 | 75.9 | 55.9 | 55.9 | 20.9 |
| Multi-vinyl ether compound having three or more vinyl ether groups | VE1 | | | | | | | | |
|  | VE2 | | | | | | | | | 
|  | VE3 | 10 | 15 | 70 | 80 | | | | |
|  | VE4 | | | | | | | | |
|  | VE5 | | | | | | | | |
| Compound having acryloyl group | EHA | 10 | | | | | 20 | 10 | |
|  | 1,6-hexanediol diacrylate | 5 | | | | | | 10 | |
|  | OXT221 | | | | | | | | 20 |
|  | C2021P | | | | | | | | 50 |
|  | ISODAP | | 20 | | | 15 | 15 | 15 | |
|  | CPI-100P | 4 | 4 | 4 | 4 | 4 | 4 | 4 | 4 |
|  | Darocure1173 | | | | | | | | |
|  | Diethoxy anthracene | 1.5 | 1.5 | 1.5 | 1.5 | 1.5 | 1.5 | 1.5 | 1.5 |
|  | 2-Ethylamino ethanol | 0.03 | 0.03 | 0.03 | 0.03 | 0.03 | 0.03 | 0.03 | 0.03 |
|  | TEMPO | 0.03 | 0.03 | 0.03 | 0.03 | 0.03 | 0.03 | 0.03 | 0.03 |
|  | KF351 | 0.04 | 0.04 | 0.04 | 0.04 | 0.04 | 0.04 | 0.04 | 0.04 |
| Evaluation Results | Continuous ejection stability | B | A | B | C | B | B | B | C |
|  | Curability (surface tackiness) | A | A | A | B | C | C | C | B |
|  | Odor | A | A | A | A | C | C | C | A |
|  | Solvent resistance | A | A | A | A | C | C | C | A |
|  | Weather resistance | A | A | A | A | B | B | B | C |

Inv.: Inventive example,
Comp.: Comparative example

The results described in Table 1 clearly show that any of the inks of the present invention exhibits excellent continuous ejection stability, curability, solvent resistance, and weather resistance, compared to the comparative inks in the recording method by multi-pass.

Example 2

Preparation of Inks

In the same manner as Example 1, Inks 18-26 as described in Table 2 were prepared. Evaluation by ink-jet recording is carried out in the same manner as Example 1 except for increasing printing pass numbers to 16 and decreasing current value to LED resulting in irradiation energy 5 mJ/cm². Evaluation results are shown in Table 2.

This evaluation condition corresponds to be severe because increasing the pass number and irradiating low exposure energy per pass compared to Example 1 results in lowering the curability for the ink mainly based on vinyl ether.

Used ink compositions and the results are shown in Table 2.

of vinyl ether group exhibit enough weather resistance even under the severe recording condition for having curability.

Example 3

By using same Ink 3 and Ink 14 of Example 1 and the same recording apparatus as Example 1, image was recorded on an aluminum grained plate as the substrate. At most 2 droplets were used per pixel as the recording condition.

Resulting recording image was used to offset printing as a printing plate.

Printing plate using Ink 3 exhibited good printing performance without fluctuating dot gain after offset printing 20 thousand or more sheets.

On the contrary, printing plate using Ink 14 exhibited apparent degradation of dot gain after offset printing 20 thousand or more sheets and did not exhibit enough printing performance.

Thus, the ink-jet ink of the present invention exhibit excellent curability and have high abrasion resistance to printing ink or dampening solution.

TABLE 2

| | | Inv. Ink 18 | Inv. Ink 19 | Inv. Ink 20 | Inv. Ink 21 | Inv. Ink 22 | Inv. Ink 23 | Inv. Ink 24 | Inv. Ink 25 | Inv. Ink 26 |
|---|---|---|---|---|---|---|---|---|---|---|
| Pigment | PY150 | | | | | | | | | |
| | PR122 | | | | | | | | | |
| | PB15:4 | 2.5 | 2.5 | 2.5 | 2.5 | 2.5 | 2.5 | 2.5 | 2.5 | 2.5 |
| | Carbon black | | | | | | | | | |
| | Titanium oxide | | | | | | | | | |
| Dispersant | PB824 | 1 | 1 | 1 | 1 | 1 | 1 | 1 | 1 | 1 |
| Bis-vinyl ether compound | TEGDVE | 50.9 | 50.9 | 35.9 | 30.9 | 25.9 | 40.9 | 50.9 | 50.9 | 50.9 |
| Multi-vinyl ether compound having three or more vinyl ether groups | VE1 | 40 | | | | | | | | |
| | VE2 | | 40 | 40 | 30 | 20 | 40 | | | |
| | VE3 | | | | | | | 40 | | |
| | VE4 | | | | | | | | 40 | |
| | VE5 | | | | | | | | | 40 |
| Compound having acryloyl group | Octyl acrylate | | | 15 | 30 | 45 | | | | |
| | 1,6-hexanediol diacrylate | | | | | | 10 | | | |
| | OXT221 | | | | | | | | | |
| | C2021P | | | | | | | | | |
| | ISODAP | | | | | | | | | |
| | CPI-100P | 4 | 4 | 4 | 4 | 4 | 4 | 4 | 4 | 4 |
| | Darocure1173 | | | | | | | | | |
| | Diethoxy anthracene | 1.5 | 1.5 | 1.5 | 1.5 | 1.5 | 1.5 | 1.5 | 1.5 | 1.5 |
| | 2-Ethylamino ethanol | 0.03 | 0.03 | 0.03 | 0.03 | 0.03 | 0.03 | 0.03 | 0.03 | 0.03 |
| | TEMPO | 0.03 | 0.03 | 0.03 | 0.03 | 0.03 | 0.03 | 0.03 | 0.03 | 0.03 |
| | KF351 | 0.04 | 0.04 | 0.04 | 0.04 | 0.04 | 0.04 | 0.04 | 0.04 | 0.04 |
| Evaluation Results | Continuous ejection stability | B | A | A | A | A | A | A | B | A |
| | Curability (surface tackiness) | A | A | A | A | A | A | A | B | A |
| | Odor | B | B | B | B | B | B | B | B | A |
| | Solvent resistance | B | A | A | A | A | A | A | B | A |
| | Weather resistance | B | B | A | A | B | A | B | B | A |

Inv.: Inventive example

It is found that multi-vinyl ether compound having oxyalkylene group exhibits excellent curability than that of multi-vinyl ether compound without having oxyalkylene group.

It is found that multi-vinyl ether compound having four or more vinyl ether groups exhibits excellent solvent resistance of the cured film than that of multi-vinyl ether compound having three or more vinyl ether groups.

Further it is found that the ink having multi-vinyl ether compound having butenyl ether group replaced at β-position

Example 4

Example 4-1

Inks 6-1, 7-1, 8-1, 9-1, 10-1 were prepared by to using VE1 instead of multi-vinyl ether compound having three or more vinyl ether groups VE3, in Inks 6, 7, 11, 12, 13 of Example 1.

Example 4-2

Inks 6-2, 7-2, 8-2, 9-2, 10-2 were prepared by using VE2 instead of multi-vinyl ether compound having three or more vinyl ether groups VE3, in Inks 6, 7, 11, 12, 13 of Example 1.

Example 4-3

Inks 6-3, 7-3, 8-3, 9-3, 10-3 were prepared by using VE$ instead of multi-vinyl ether compound having three or more vinyl ether groups VE3, in Inks 6, 7, 11, 12, 13 of Example 1.

Example 4-4

Inks 6-4, 7-4, 8-4, 9-4, 10-4 were prepared by using VE5 instead of multi-vinyl ether compound having three or more vinyl ether groups VE3, in Inks 6, 7, 11, 12, 13 of Example 1.

Evaluations of the inks prepared in Examples 4-1 to 4-4 are carried out in the same manner as Example 2. Inks 6-1, 7-1, 8-1, 9-1, 10-1 each exhibit equivalent results as Inks 6, 7, 11, 12, 13. Inks 6-2 to 10-2, 6-3 to 10-3, 6-4 to 10-4 also exhibit the same trend. Therefore inks having content of multi-vinyl ether compound having three or more vinyl ether groups exhibit excellent results in the ratio of 5 to 70% by mass.

Example 5

Inks 27 to 42 each having composition described in Table 3 and 4 were prepared in the same manner as Example 1. Evaluation is carried out in the same manner as Example 2. Results are shown in Table 3 and 4. Excellent results are obtained in the ratio of bi-vinyl ether compound 5 to 70% by mass.

TABLE 3

| | | Comp. Ink 27 | Inv. Ink 28 | Inv. Ink 29 | Inv. Ink 30 | Inv. Ink 31 | Comp. Ink 22 | Inv. Ink 33 | Inv. Ink 34 |
|---|---|---|---|---|---|---|---|---|---|
| Pigment | PB15:4 | 2.5 | 2.5 | 2.5 | 2.5 | 2.5 | 2.5 | 2.5 | 2.5 |
| Dispersant | PB824 | 1 | 1 | 1 | 1 | 1 | 1 | 1 | 1 |
| Bis-vinyl ether compound | TEGDVE | | | | | | | | |
| | DEGDVE | | | | | | | | |
| | CHDVE | | | | | | | | |
| | NEPGDVE | 9 | 11 | 28 | 31 | 68 | 82.9 | 11 | 68 |
| | TEGDPE | | | | | | | | |
| Multi-vinyl ether compound having three or more vinyl ether groups | VE1 | | | | | | | | |
| | VE2 | | | | | | | | |
| | VE3 | 20 | 20 | 40 | 40 | 18.9 | 4 | 6 | 6 |
| | VE4 | | | | | | | | |
| | VE5 | | | | | | | | |
| Compound having acryloyl group | Octyl acrylate | | | | | | | | |
| | 1,6-hexanediol diacrylate | | | | | | | | |
| Other polymerizable compound | OXT221 | 57.9 | 55.9 | 18.9 | 15.9 | | | 49.9 | 12.9 |
| | C2021P | | | | | | | 20 | |
| | CPI-100P | 8 | 8 | 8 | 8 | 8 | 8 | 8 | 8 |
| | Darocure1173 | | | | | | | | |
| | Diethoxy anthracene | 1.5 | 1.5 | 1.5 | 1.5 | 1.5 | 1.5 | 1.5 | 1.5 |
| | 2-Ethylamino ethanol | 0.03 | 0.03 | 0.03 | 0.03 | 0.03 | 0.03 | 0.03 | 0.03 |
| | TEMPO | 0.03 | 0.03 | 0.03 | 0.03 | 0.03 | 0.03 | 0.03 | 0.03 |
| | KF351 | 0.04 | 0.04 | 0.04 | 0.04 | 0.04 | 0.04 | 0.04 | 0.04 |
| Evaluation Results | Continuous ejection stability | A | A | A | A | A | A | A | A |
| | Curability (surface tackiness) | C | B | B | A | A | C | A | A |
| | Odor | B | B | B | A | A | C | A | A |
| | Solvent resistance | B | B | A | A | A | B | B | B |
| | Weather resistance | C | B | A | A | A | B | B | A |

Inv.: Inventive example,
Comp.: Comparative example

TABLE 4

| | | Inv. Ink 35 | Inv. Ink 36 | Inv. Ink 37 | Inv. Ink 38 | Inv. Ink 39 | Inv. Ink 40 | Inv. Ink 41 | Inv. Ink 42 |
|---|---|---|---|---|---|---|---|---|---|
| Pigment | PB15:4 | 2.5 | 2.5 | 2.5 | 2.5 | 2.5 | 2.5 | 2.5 | 2.5 |
| Dispersant | PB824 | 1 | 1 | 1 | 1 | 1 | 1 | 1 | 1 |
| Bis-vinyl ether compound | TEGDVE | | | | | | | | 60 |
| | DEGDVE | | | | | | | 60 | |
| | CHDVE | | | | | | 60 | | |
| | NEPGDVE | 11 | 17.9 | | | | | | |
| | TEGDPE | | | 60 | 45 | 45 | | | |
| Multi-vinyl ether compound having three or more vinyl ether groups | VE1 | | | | | | | 26.9 | |
| | VE2 | | | | | | 26.9 | | |
| | VE3 | 69 | 69 | | | | | | |
| | VE4 | | | 26.9 | 11.9 | 21.9 | | | |
| | VE5 | | | | | | | | 26.9 |
| Compound having acryloyl group | Octyl acrylate | | | | 30 | | | | |
| | 1,6-hexanediol diacrylate | | | | | 20 | | | |
| Other polymerizable compound | OXT221 | 6.9 | | | | | | | |
| | C2021P | | | | | | | | |
| | CPI-100P | 8 | 8 | 8 | 8 | 8 | 8 | 8 | 8 |
| | Darocure1173 | | | | | | | | |

TABLE 4-continued

|  |  | Inv. Ink 35 | Inv. Ink 36 | Inv. Ink 37 | Inv. Ink 38 | Inv. Ink 39 | Inv. Ink 40 | Inv. Ink 41 | Inv. Ink 42 |
|---|---|---|---|---|---|---|---|---|---|
|  | Diethoxy anthracene | 1.5 | 1.5 | 1.5 | 1.5 | 1.5 | 1.5 | 1.5 | 1.5 |
|  | 2-Ethylamino ethanol | 0.03 | 0.03 | 0.03 | 0.03 | 0.03 | 0.03 | 0.03 | 0.03 |
|  | TEMPO | 0.03 | 0.03 | 0.03 | 0.03 | 0.03 | 0.03 | 0.03 | 0.03 |
|  | KF351 | 0.04 | 0.04 | 0.04 | 0.04 | 0.04 | 0.04 | 0.04 | 0.04 |
| Evaluation Results | Continuous ejection stability | B | B | A | A | A | A | A | A |
|  | Curability (surface tackiness) | A | A | A | A | A | A | A | A |
|  | Odor | A | A | A | A | A | A | A | A |
|  | Solvent resistance | A | A | A | A | A | A | A | A |
|  | Weather resistance | A | A | A | A | A | A | A | A |

Inv.: Inventive example

Herein, abbreviated names of bi-vinyl ether compound are shown bellow:
TEGDVE: Triethyleneglycol divinyl ether
DEGDVE: Diethyleneglycol divinyl ether
CHDVE: Cyclohexanediol divinyl ether
NEPGDVE: Neopentylglycol divinyl ether
TEGDPE: Triethyleneglycol dipropenyl ether

What is claimed is:

1. An actinic energy radiation curable ink-jet ink comprising:
    an actinic energy radiation polymerizable compound, wherein
    the actinic energy radiation polymerizable compound comprises a vinyl ether compound, a total content of the vinyl ether compound is 70-98% by mass of the ink,
    the vinyl ether compound comprises a bis-vinyl ether compound and a multi-vinyl ether compound having three or more vinyl, ether groups,
    40 to 70% by mass of the ink is the bis-vinyl ether compound, and
    5 to 70% by mass of the ink is the multi-vinyl ether compound.

2. The actinic energy radiation curable ink-jet ink of claim 1 further comprising an acryloyl compound or a methacryloyl compound.

3. The actinic energy radiation curable ink-jet ink of claim 2, wherein a content of the acryloyl compound or the methacryloyl compound is 1-45% by mass of the ink.

4. The actinic energy radiation curable ink-jet ink of claim 2, wherein a content of the multi-vinyl ether compound is 15-70% by mass of the ink.

5. The actinic energy radiation curable ink-jet ink of claim 2, wherein the multi-vinyl ether compound comprises an oxyalkylene group.

6. The actinic energy radiation curable ink-jet ink of claim 5, wherein the multi-vinyl ether compound comprises four or more vinyl ether groups.

7. The actinic energy radiation curable ink-jet ink of claim 5, wherein at least one vinyl ether group of the multi-vinyl ether compound is represented by Formula 1;

Formula 1:

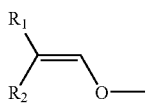

wherein $R_1$ and $R_2$ represents a hydrogen atom and an organic group, and a total number of carbon atoms in the organic group represented by $R_1$ and $R_2$ is 1 or more.

8. The actinic energy radiation curable ink-jet ink of claim 1, wherein a content of the bis-vinyl ether compound is 40-70% by mass of the ink.

9. The actinic energy radiation curable ink-jet ink of claim 1, wherein a content of the multi-vinyl ether compound is 15-70% by mass of the ink.

10. The actinic energy radiation curable ink-jet ink of claim 1, wherein the multi-vinyl ether compound comprises an oxyalkylene group.

11. The actinic energy radiation curable ink-jet ink of claim 1, wherein the multi-vinyl ether compound comprises four or more vinyl, ether groups.

12. The actinic energy radiation curable ink-jet ink of claim 1, wherein at least one vinyl ether group of the multi-vinyl ether compound is represented by Formula 1;

Formula 1:

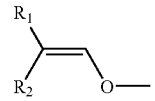

wherein $R_1$ and $R_2$ represents a hydrogen atom and an organic group, and a total number of carbon atoms in the organic group represented by $R_1$ and $R_2$ is 1 or more.

13. The actinic energy radiation curable ink-jet ink of claim 1, wherein a viscosity of the ink is 5 to 50 mPa·s at 25° C.

14. The actinic energy radiation curable ink-jet ink of claim 1, wherein a surface tension of the ink is 22 to 35 mN/m at 25° C.

15. The actinic energy radiation curable ink-jet ink of claim 1, wherein a total amount of an ion of Na ion, Ca ion and Mg ion in the ink is 100 ppm or less.

16. An ink-let recording method for forming an image comprising steps of:
    applying the actinic energy radiation curable ink-jet ink claim 1 onto a substrate, radiating an actinic energy radiation onto the actinic energy radiation curable ink-jet ink on the substrate.

17. An ink-jet recording method of claim 16 further comprising steps of:
    applying the actinic energy radiation curable ink-jet ink of claim 1 onto the actinic energy radiation curable ink-jet ink radiated by the actinic energy radiation, and radiating an actinic energy radiation onto the actinic energy radiation curable ink-jet ink.

* * * * *